(12) United States Patent
Hama (10) Patent No.: US 6,559,978 B1
(45) Date of Patent: May 6, 2003

(54) IMAGE READER

(75) Inventor: Hidetaka Hama, Iwatsuki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/514,148

(22) Filed: Feb. 28, 2000

(30) Foreign Application Priority Data

Mar. 15, 1999 (JP) ............................................ 11-068667

(51) Int. Cl.$^7$ ............................ H04N 1/36; H04N 1/04; H04N 1/00

(52) U.S. Cl. ...................... 358/412; 358/474; 358/409; 358/412; 358/413; 358/437

(58) Field of Search ................................ 358/474, 412, 358/413, 409, 437

(56) References Cited

U.S. PATENT DOCUMENTS

| | | | | |
|---|---|---|---|---|
| 5,283,668 A | * | 2/1994 | Hiramatsu | 358/474 |
| 5,692,229 A | * | 11/1997 | Ishimoto et al. | 399/2 |
| 6,037,734 A | * | 3/2000 | Toyomura | 318/602 |
| 6,175,666 B1 | * | 1/2001 | Yoshida | 382/312 |
| 6,323,959 B1 | * | 11/2001 | Toyama et al. | 382/312 |

FOREIGN PATENT DOCUMENTS

JP   9-200433   7/1997

* cited by examiner

Primary Examiner—Edward Coles
Assistant Examiner—Houshang Safaipour
(74) Attorney, Agent, or Firm—Morgan, Lewis & Bockius LLP (57) ABSTRACT

An image reader provided with an image pick-up unit which reads an image in a fast scanning direction in accordance with a fast scanning synchronizing signal, a drive unit which causes the image pick-up unit to move in a slow scanning direction in accordance with a drive control signal asynchronous with the fast scanning synchronizing signal, an intermittent read instruction unit which generates a stop instruction and a restart instruction for allowing the image reading to be performed intermittently by the image pick-up unit, a phase holding unit which, upon issuance of a stop instruction, recognizes and holds a phase difference between the fast scanning synchronizing signal and the drive control signal, and a phase control unit which, upon issuance of a restart instruction, corrects a phase difference between the fast scanning synchronizing signal and the drive control signal on the basis of the phase difference recognized and held by the phase holding unit. According to this image reader, the occurrence of an image quality trouble such as an image displacement at an image joint portion is prevented in an intermittent image data reading operation.

4 Claims, 6 Drawing Sheets

FIG.1

FIG.3A INTERRUPTION OF READ

FIG.3B RESTART OF READ

FIG.5A STOP OF INTERMITTENT OPERATION

FIG.5B RESTART OF INTERMITTENT OPERATION

PHASE REMAINING SAME ASSURES ACCURATE IMAGE CONNECTION

FIG.6B
RESTART OF INTERMITTENT OPERATION

CHANGE OF PHASE CAUSES MAXIMUM OF ONE-LINE DISCREPANCY

FIG.6A
STOP OF INTERMITTENT OPERATION

IMAGE READER

BACKGROUND OF THE INVENTION

1. Field of the Invention

The present invention relates to an image reader for reading image data optically from an original to be read by using an image pick-up device such as a CCD (Charge Coupled device) which reads images in a fast scanning direction and by moving a scanning carriage with a mirror, etc. mounted thereon in a slow scanning direction with use of a stepping motor for example.

2. Description of the Prior Art

Generally, in an image reader, if the data processing performance of a system connected at a succeeding stage to the image reader is sufficiently high in image data reading speed, it is possible to effect image reading without stopping the scanning operation, but if the data processing performance (also including the data transfer band width) of the succeeding system is low, it is necessary to synchronize the image data reading speed with the lowest processing speed portion. For example, in the case where a personal computer (hereinafter referred to as "PC") is connected as the succeeding system to the image reader and images are to be inputted to the PC, the data transfer speed at I/F to the PC and the data writing speed of an external storage become a bottleneck. For properly controlling the image data reading speed there has been proposed, for example, such an image reader as disclosed in Japanese Published Unexamined Patent Application No. Hei 9-200433, in which the procedure of image data reading (image data buffering)→stop reading→transfer of image data→restart reading→stop reading→transfer of image data→ . . . is repeated and image data is read intermittently.

Such intermittent data reading is adopted in many image readers because the data processing performance of the succeeding system is undefined in many cases.

Figure 5A:
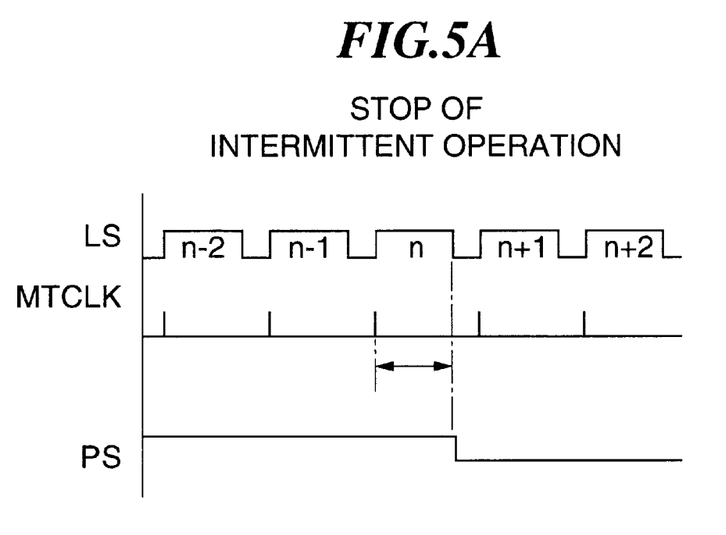
FIGS. 5A and 5B are timing charts showing an example of operation control in intermittent read in a conventional image reader.
Figure 5B:
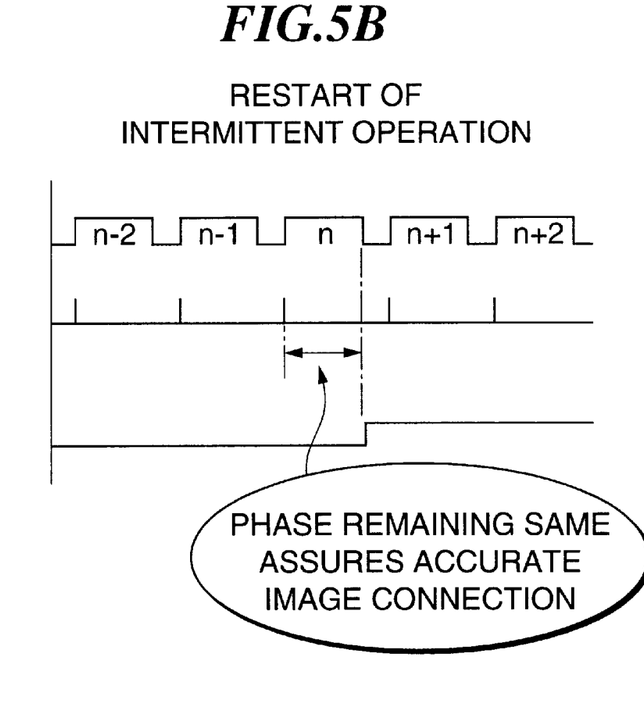

For realizing a satisfactory image quality of read image data in such an intermittent image reader it is necessary to prevent the occurrence of an image quality trouble such as image displacement at a joint portion of intermittent operations. To meet this requirement, in a conventional image reader which performs an intermittent image data reading, as shown in FIG. 5, there is adopted a line step method in which a fast scanning synchronizing signal (LineSync signal) for controlling the read timing in the fast scanning direction and a sensor drive signal (CCDCLK signal) for driving a CCD, etc. (both signals will hereinafter be referred to together as "LS") as well as a motor drive control signal (MotorClock signal, "MTCLK" hereinafter) for controlling the operation of a motor in the slow scanning direction, are synchronized their phases and frequencies and an LS cycle is made into an integer multiple of an MTCLK cycle. By adopting such a line step method it is made possible to effect joint alignment in the intermittent operation.

Although the above line step method is easily applicable to a scanner for a PC and a facsimile device in which the motor driving speed (scanning speed in the slow scanning direction) is relatively low and there is a high degree of freedom, it is difficult to apply the same method to a copying machine or the like in which the motor driving speed is relatively high and the degree of freedom is low.

This is because in a copying machine or the like the driving speed of a scanning carriage must basically be made equal to the processing speed of an image output terminal (IOT) and also because it is necessary to attain optimization of vibration, thus making it difficult to synchronize the reduction ratio from a drive motor to the scanning carriage with the LS cycle. A further reason is that in a copying machine or the like constructed so as to change the motor speed and perform scaling processing when an arbitrary scale factor has been set in the slow scanning direction it is impossible to keep constant the relation between phase and frequency of LS and MTCLK.

Figure 6A:
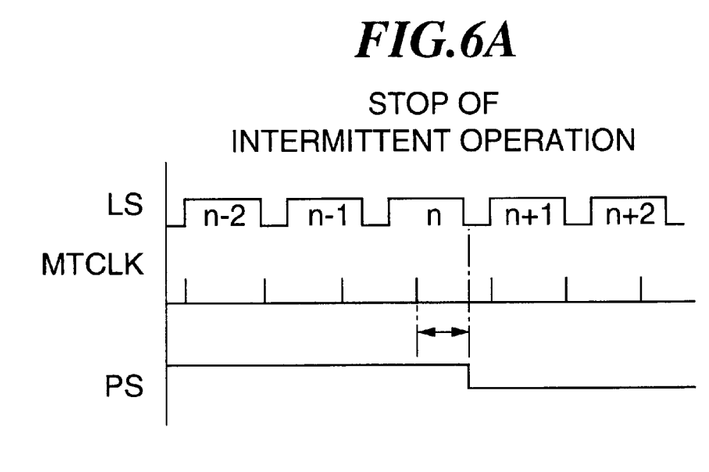
FIGS. 6A and 6B are timing charts showing another example of operation control in intermittent read in the conventional image reader.
Figure 6B:
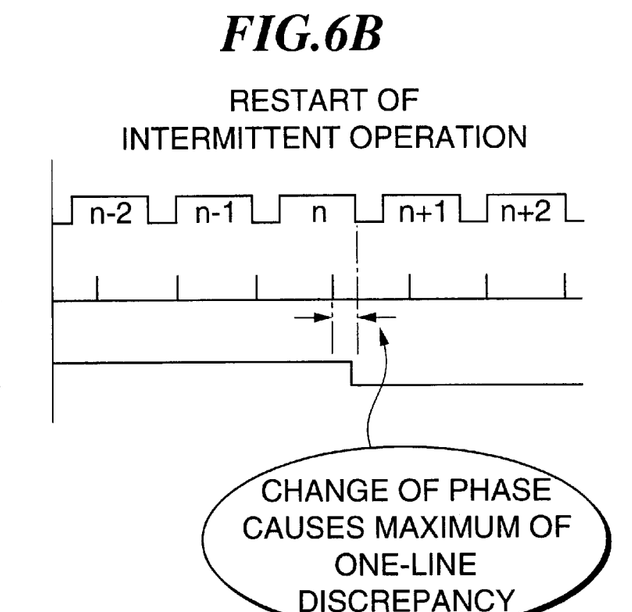

In an image reader used in such a copying machine or the like, if an intermittent drive control is made without adopting the line step method and without taking any countermeasure, there will occur a phase shift between MTCLK (=a physical position of the scanning carriage) and LS, as shown in FIG. 6, thus giving rise to a fear that there may occur a read position displacement corresponding to a maximum of one line before and after an intermittent operation. As a result, an oblique line displacement or the like will occur at a joint portion of read images. Moreover, in reading color images, there will occur such an image quality trouble as color misregistration.

On the other hand, it may be effective to constitute an image reader in such a manner that after reading image data, not intermittently, and once storing the read data in a memory such as a page memory, there are performed read-out of image data from the memory in accordance with the data processing performance of a succeeding system and transfer of the data to the succeeding system. In this case, however, a large capacity of memory is needed because the quantity of image data has been increasing in an accelerative manner with the recent tendency to higher read resolution and coloring of image, thus leading to an increase of the device cost.

SUMMARY OF THE INVENTION

The present invention has been accomplished in view of the above-mentioned circumstances and provides an image reader which, in performing an intermittent image data reading, can prevent the occurrence of an image trouble such as image displacement at a joint portion of intermittent operations without the need of such a memory as a page memory even if a signal LS for making a read control in the fast scanning direction and a signal MTCLK for controlling the movement in the slow scanning direction are asynchronous with each other.

The image reader of the present invention is provided with an image pick-up unit which reads an image in a fast scanning direction in accordance with a fast scanning synchronizing signal of a predetermined cycle, a drive unit which causes the image pick-up unit to move in the slow scanning direction in accordance with a drive control signal asynchronous with the fast scanning synchronizing signal, an intermittent read instruction unit which generates a stop instruction and a restart instruction for allowing the image reading to be performed in the slow scanning direction by the image pick-up unit, a phase holding unit which recognizes and holds a phase difference between the fast scanning synchronizing signal and the drive control signal upon issuance of a stop instruction from the intermittent read instruction unit, and a phase correcting unit which, upon issuance of a restart instruction from the intermittent read instruction unit, corrects a phase difference between the fast scanning synchronizing signal and the drive control signal on the basis of the phase difference recognized and held by the phase holding unit.

In the image reader of the above configuration, the drive unit makes a switch-over whether the image pick-up unit is to be moved in the slow scanning direction or not in accordance with the stop instruction and the restart instruction both generated by the intermittent read instruction unit, whereby the image pick-up unit reads images in the slow scanning direction intermittently. In this image reader, in accordance with the stop instruction and the restart instruction from the intermittent read instruction unit the phase holding unit holds a phase difference between a fast scanning synchronizing signal (say, LS) and a drive control signal (say, MTCLK), and on the basis of the phase difference thus held the phase correcting unit corrects the phase difference between the fast scanning synchronizing signal and the drive control signal. As a result, the phase difference between both signals at the time of restart of the intermittent read becomes equal to that at the time of stop of the intermittent read. Thus, in this image reader, even if the fast scanning synchronizing signal and the drive control signal are asynchronous, the occurrence of a phase shift between both signals at the time of stop and restart of the intermittent read is prevented.

BRIEF DESCRIPTION OF THE DRAWINGS

Preferred embodiments of the present invention will be described in detail hereunder with reference to the accompanying drawings, wherein:

FIGS. 3A and 3B are timing charts showing an example of an operation control in intermittent read in the image reader of the first embodiment, in which

FIGS. 4A and 4B are timing charts showing an example of an operation control in intermittent read in the image reader of the second embodiment, in which

DETAILED DESCRIPTION OF THE PREFERRED EMBODIMENTS

The following describes the image reader of the present invention based on the drawings.

[First Embodiment]

First, a description will be given below of a basic configuration of the image reader according to this embodiment.

Figure 1:
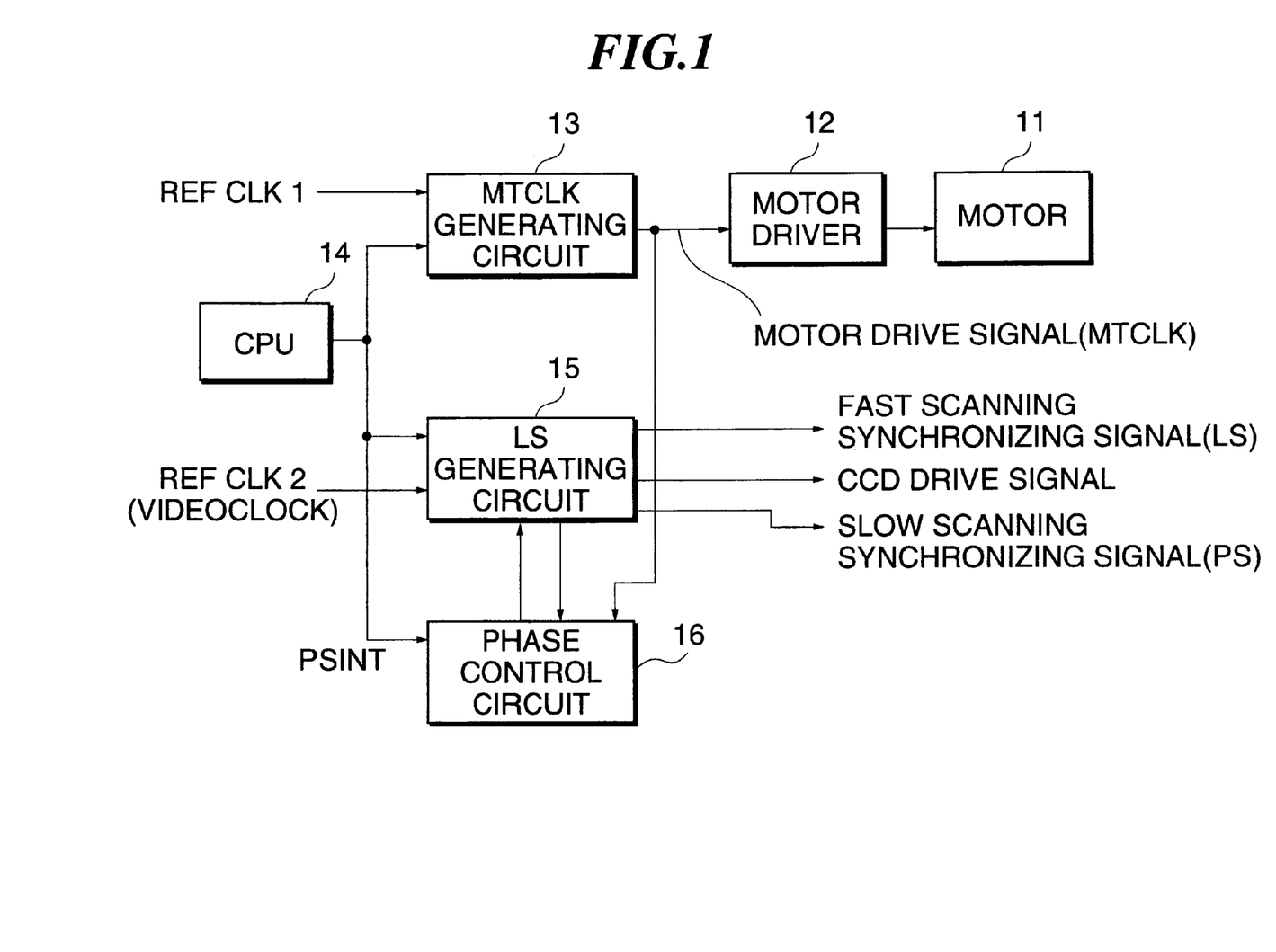
FIG. 1 is a block diagram showing a schematic configuration example of principal portions of an image reader according to the present invention.

FIG. 1 is a block diagram showing a schematic configuration example of the image reader.

The image reader of this embodiment is configured so that a motor 11, which is a stepping motor for example, causes a scanning carriage (not shown) with a lamp for lighting and a mirror carried thereon to move in the slow scanning direction, thereby allowing a CCD (not shown) to read an image from an original to be read.

The motor 11 operates in accordance with a instruction provided from a motor driver 12. MTCLK fed to the motor driver 12 is a signal which is produced by an MTCLK generating circuit 13 and which is for controlling the operation of the motor 11. In accordance with MTCLK produced by the MTCLK generating circuit 13 the motor 11 causes the scanning carriage to move in the slow scanning direction.

The MTCLK generating circuit 13 produces MTCLK in accordance with a predetermined clock signal ("REF CLK 1" hereinafter) as a reference signal and while following control made by a CPU (Central Processing Unit) 14 which controls the operation of the entire image reader. By changing the frequency of REF CLK 1, the frequency of MTCLK produced by the MTCLK generating circuit 13 also changes, with the result that the operating speed of the motor 11 can be controlled.

The CPU 14 counts and stores the number of MTCLKs produced from the time when the motor 11 started operation, whereby it becomes possible to accurately grasp a physical position of the scanning carriage.

On the other hand, in accordance with LS produced by an LS generating circuit 15, more specifically, LineSync signal for controlling the read timing in the fast scanning direction and CCDCLK signal for driving the CCD, the CCD read images in the fast scanning direction.

The LS generating circuit 15 produces LS as a synchronizing signal in the fast scanning direction in accordance with a clock signal ("REF CLK 2" hereinafter) as a reference signal separate from REF CLK 1, say, VIDEO CLOCK signal fed to the LS generating circuit 15. Usually, in a loop counter ("LS-COUNTER" hereinafter) which the LS generating circuit 15 possesses, REF CLK 2 is incremented using a hardware and LS is outputted in a free running state with a predetermined certain cycle. Consequently, the LS produced by the LS generating circuit 15 is asynchronous with the MTCLK generated by the MTCLK generating circuit 13.

One cycle of LS thus generated corresponds to one line of image read in the fast scanning direction. A drive timing of the CCD which performs image reading is generated on the basis of the LS-COUNTER which is used for the generation of LS. Thus, LS and CCD drive timing are linked together in operation.

The CPU 14 provides operation instructions to various components of the image reader, including MTCLK generating circuit 13 and LS generating circuit 15. One of the operation instructions provided by the CPU 14 is for intermittent data reading. More specifically, since the CPU grasps an accurate position of the scanning carriage as mentioned above, it produces a PSINT signal as an intermittent read stop or restart instruction at an arbitrary position where intermittent read stop or restart is to be conducted, and then provides the PSINT signal to a phase control circuit 16.

Upon receipt of the PSINT signal from the CPU 14 the phase control circuit 16 makes a phase control for both MTCLK and LS, the details of which will be described later. In response to the phase control made by the phase control circuit 16 the LS generating circuit 15 outputs a slow scanning synchronizing signal ("PS" hereinafter) for defining an effective image area in the slow scanning direction in image reading carried out by the CCD.

The following description is now provided about an outline of the intermittent reading operation performed by the image reader configured as above.

Figure 2A:
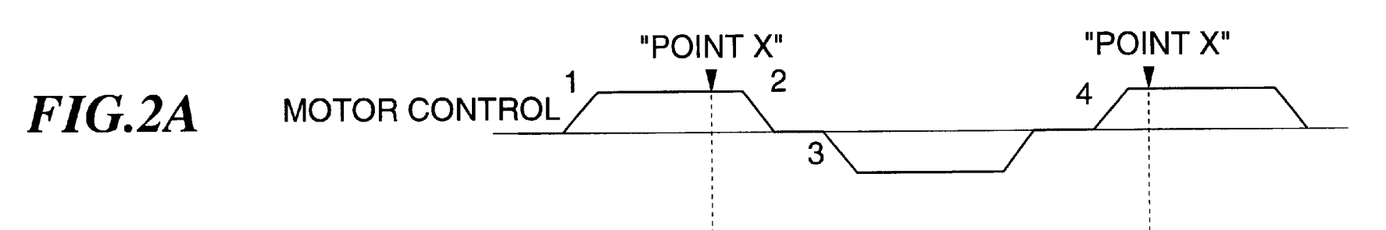
FIGS. 2A and 2B are explanatory diagrams showing an example of a relation between a motor control sequence in intermittent drive and an effective read range in the image reader.
Figure 2B:
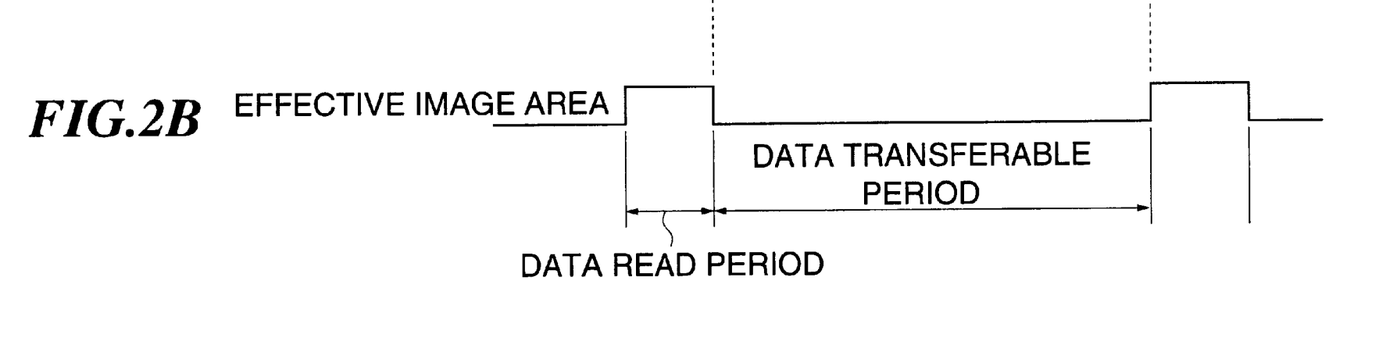

FIG. 2 is an explanatory diagram showing an example of a relation between a motor control sequence in intermittent drive and an effective read range.

In this image reader, the CCD starts image reading after slowing-up and reaching a normal speed of the motor 11 (see (1) in the figure). When the CCD has read a predetermined amount of data (buffering) and a physical position of the scanning carriage has reached "Point X" in the slow scanning direction, the motor 11 slows down and stops (see (2) in the figure).

After stop of the motor 11, for restarting the next intermittent data reading from "Point X," the motor 11 is driven in the opposite direction (see (3) in the figure) so as to return the position of the scanning carriage up to such a slow-up start position as permits the operating speed of the motor 11 to become its normal speed at the "Point X." Usually, between the above (2) and (3) there is performed the transfer of image data to the succeeding system from an image data buffer. Upon completion of the image data transfer, the motor is slowed up for the restart of intermittent read and image reading is started again from "Point X" (see (4) in the figure).

In the image reader being considered, the difference in data processing speed from the succeeding system is absorbed by repeating such a sequence.

Reference will be made below to an operation control in intermittent image data reading which is a characteristic point of the image reader of this embodiment.

Figure 3A:
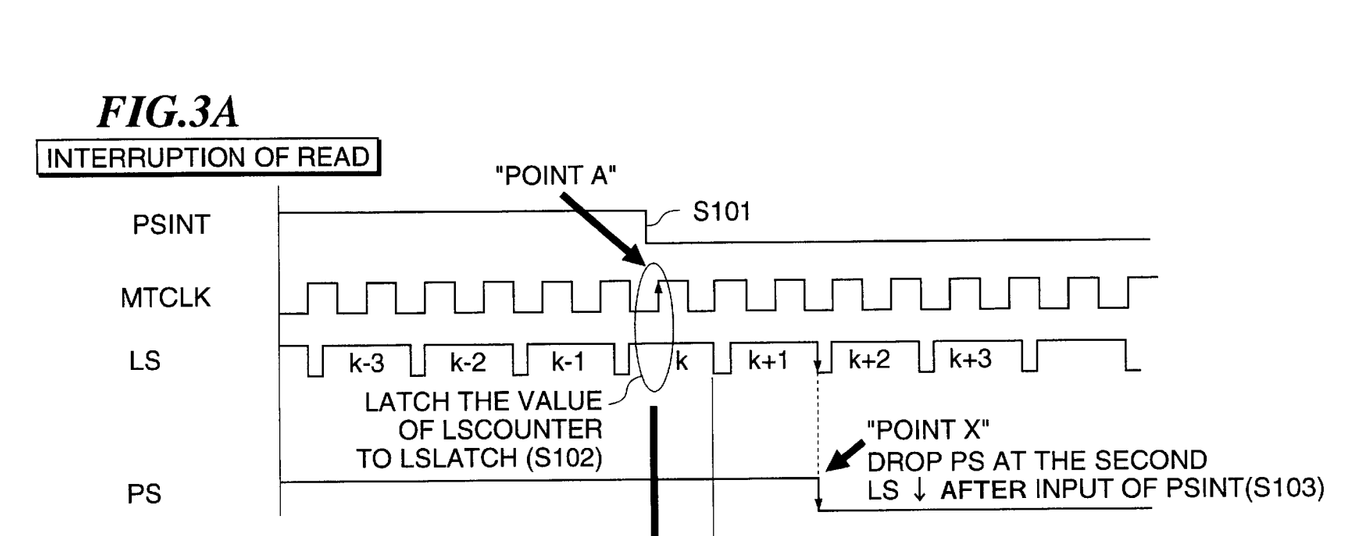
FIG. 3A is a timing chart in stopping the intermittent read and FIG. 3B is a timing chart in restarting the intermittent read.
Figure 3B:
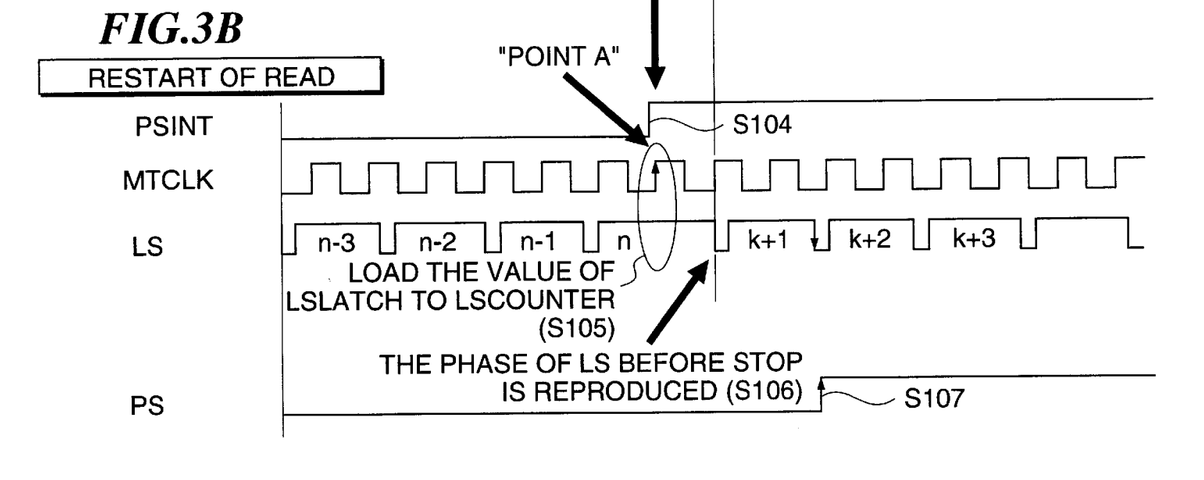

FIGS. 3A and 3B are timing charts showing an example of control for intermittent image data reading operations.

First, a description will be given of an operation control for stopping an intermittent data reading operation. Description is here directed to a joint control in the same operation. As to the operation control at the beginning of data reading operation, it is the same as in the conventional control, so an explanation thereof will here be omitted.

In FIG. 3A, the PSINT signal fed to the phase control circuit 16 by the CPU 14 is of such a logic that data reading is started at H and is stopped at L. Therefore, when the scanning carriage has advanced to a position where data reading is to be stopped, the CPU 14 drops the level of the PSINT signal from H to L (step 101, the step will hereinafter be referred to simply as "S"). Upon drop in level of the PSINT signal from H to L, the same signal is synchronized with an edge of MTCLK in the phase control circuit 18 and becomes an internal PSINT signal ("INR-PSINT" signal hereinafter). A fall edge of the INR-PSINT signal represents a physical read stop position "Point A" in the slow scanning direction.

At this time, the phase control circuit 16 receives from the LS generating circuit 15 a count value of the LS-COUNTER at the instant of the fall edge of the INR-PSINT signal and latches it into an LS phase storing register ("LS-LATCH" hereinafter) (not shown) which the phase control circuit 16 possesses (S102). The count value thus latched into the LS-LATCH is a count value of REF CLK 2 which is incremented by the LS-COUNTER and which corresponds to the count value of REF CLK 2 counted from a rise edge of LS.

If the timing of the latching operation varies at this time, it will exert a great influence on the image displacement compensating accuracy, so it is desirable that the latching operation for the LS-LATCH be performed using a hardware. In the image reader being considered, therefore, it is premised to perform the latching operation using a hardware with the accuracy of VIDEO CLOCK signal.

Subsequent to the latching operation for the LS-LATCH, the phase control circuit 16, after fall of the INR-PSINT signal to L and after at least twice L output of LS, causes PS to drop to L which PS is a synchronizing signal for defining an effective image area in the slow scanning direction in a single intermittent read. As a result, the PS outputted from the LS generating circuit 15 is disabled (S103). This point corresponds to the previous "Point X." The number of fall edges of LS may be counted, for example, by the phase control circuit 16 using a hardware. The reason why PS is not dropped to L at a fall edge of LS just after fall of the INR-PSINT signal but is dropped to L at a fall edge of LS after twice output of L will be described later.

Taking into account that image reading is continued at least two lines as noted previously even after the drop of PSINT signal to L, the CPU 14 causes the motor 11 to slow down after taking a sufficient margin. In the case of a control wherein image reading is continued two lines or more, it goes without saying that the motor slows down after taking a distance proportional thereto. After completion of the slow-down, the motor 11 is driven in the opposite direction while counting MTCLK, to return the scanning carriage up to a start position for the restart of image data reading. In this case, a return quantity of the scanning carriage is determined taking into account that when the carriage has reached the foregoing "Point A" after restart-up of the motor 11, the carriage is at its normal speed.

In this image reader there is performed an operation control in the above-described manner at the time of stopping the intermittent image data reading operation. After the stop of intermittent read, image data which have been buffered in the intermittent read are transferred to the succeeding system during the stop period (the most efficient is to carry out data transfer during slow-down/return/slow-up) and intermittent read is restarted after completion of the data transfer.

The following description is now provided about an operation control for restarting the intermittent read.

In FIG. 3B, for restarting the read, the CPU 14 causes the motor 11 to slow up. At this time, a physical present position of the scanning carriage is grasped accurately by the CPU 14 through the number of pulses of MTCLK counted after dropping the level of PSINT signal to L. Therefore, when the scanning carriage has again reached "Point A", the CPU 14 can bring the PSINT signal level from L to H (S104). The PSINT signal is synchronized to an edge of MTCLK in the phase control circuit 16 and rises as INR-PSINT signal.

Since LS and MTCLK are asynchronous with each other, the stop time of the motor 11 is also indefinite. Therefore, when the scanning carriage has reached "Point A", a phase relation between LS and MTCLK also becomes indefinite.

To avoid this inconvenience, at a rise edge of the INR-PSINT signal the phase control circuit 16 loads the count value which has been latched in LS-LATCH to LS-COUNTER in the LS generating circuit 15 (S105). As a result, in the LS generating circuit 15 the count value of REF CLK 2, which is incremented in LS-COUNTER, is replaced by the count value latched in LS-LATCH. That is, the phase of LS is corrected on the basis of the phase difference which has been latched in LS-LATCH, so that as to the phase of LS relative to MTCLK, the state in the stop of intermittent read is reproduced (S106).

At this time, for a certain reason on the hardware side which constitutes the LS generating circuit 15 or the phase control circuit 16, the phase of LS may shift by a maximum of one clock of REF CLK 2 during the stop of intermittent operation. For example, however, in the case where the image reader reads a size A3 original at 600 dpi, it follows that the number of clocks per line is approximately 7000 clocks, so even if there is a positional deviation in the slow scanning direction, the quantity of the deviation is 1/7000 and thus can be regarded as being approximately zero.

When loading the count value in LS-LATCH to LS-COUNTER, it is to be noted that there may occur an unnecessary fall edge of LS, depending on the timing of latching the count value to LS-LATCH and the timing of loading it to LS-COUNTER. More specifically, where the value of LS-COUNTER is latched to LS-LATCH with LS being L, if LS is H at the time of re-loading, the LS changes from H to L the instant the count value latched in LS-LATCH is loaded to LS-COUNTER, but this is not a regular fall edge of LS. If only the number of fall edges of LS is counted and control is made for PS without taking such a case into account, PS will rise one line earlier than usual at the time of restart of intermittent read and there will arise an image trouble in which the data in a joint portion overlaps a stop condition. The occurrence of such an image trouble can be prevented by providing a special latch (say, a flip-flop circuit) in the phase control circuit 16, storing the status of LS in the special latch at the time of latching the value of LS-COUNTER to LS-LATCH and, in re-loading, making a condition decision on the basis of the status stored in the special latch.

After the counter value latched in LS-LATCH has thus been loaded to LS-COUNTER and the phase difference between MTCLK and LS has been corrected, the phase control circuit 16 makes control to raise the signal level of PS to H after the rise of INR-PSINT signal to H and after at least twice output of LS fall, namely at "Point X", as is the case with the stop of intermittent operation. As a result, the PS which is outputted from the LS generating circuit 15 is enabled (S107).

In this way it becomes possible to prevent the occurrence of a positional deviation of image before and after the stop and restart of intermittent operation in this image reader.

Although in this image reader a margin corresponding to at least two lines is provided after a change (H→L or L→H) in output condition of INR-PSINT signal and until a change in output condition of PS, this is for a certain reason in operation of the CCD which is used as a read sensor.

To be more specific, as to the LS generated by the LS generating circuit 15, the value of LS-COUNTER is changed forcibly at "Point A" when intermittent read is restarted, so at that time the length of H period become indefinite. On the other hand, the CCD is a device which converts incident light into an electric charge, in which an integral value corresponding to one cycle of LS is the amount of electric charge (=CCD output level), so that there is obtained an output proportional to the quantity of light received during the one cycle. Therefore, if the cycle of LS is indefinite, the output level of the CCD also becomes indefinite and there will arise, for example, an image trouble such that an image is dark at a short LS cycle and is bright at a long LS cycle. At the time of reading image data for the next line, an improper image data involving such an image trouble is outputted from the CCD via an analog shift register included in the CCD.

Such improper image data can be excluded by reading and discarding image data corresponding to two LSs, i.e., LS whose length has become indefinite by phase control and LS involving output of improper image data, at the time of restarting the intermittent operation. If the length of LS is indefinite and the storage time of the CCD in this state is indefinite, the image data present at k+1 line become improper, so the image data present at n line and k+1 line are read and discarded. Taking this point into account, image data are read in a larger quantity by two lines at the time of stopping the reading operation.

In an image reader for color images using 3-line color sensors, physical reading positions in certain instants differ among the line sensors. Usually, for correction of this point, a delaying memory (gap memory) is used to delay image data of 1'st and 2'nd colors (the sensor most preceding at its physical position in reading in a certain instant is assumed to be the 1'st color). It is necessary to take this point into account. For example, in the case of a 4-line color gap sensor there is made alignment by delaying 1'st color by 8 lines relative to 3'rd color. It follows that the first-line 1'st color image data just after rise of PS correspond to 8-line past data relative to the rise of PS. At this time, if phase control is made while ensuring a 2-line margin without taking this gap correction into account, there will occur an image quality trouble because improper data corresponding to the foregoing two LSs are included in the 1'st and 2'nd color image data. In such a case, therefore, it is necessary that phase control be made in anticipation of a margin corresponding to at least 10 lines for obtaining a normal image.

According to the image reader of this embodiment, the count value of LS-COUNTER is latched to LS-LATCH in accordance with PSINT signal during stop of the intermittent data reading operation, thereby recognizing and storing a phase difference between MTCLK and LS, while at the time of restarting the same operation, the count value latched to LS-LATCH is loaded to LS-COUNTER, thereby correcting the phase difference between MTCLK and LS. Therefore, even if MTCLK and LS are asynchronous with each other, the phase difference between both signals in restarting the intermittent data reading operation becomes equal to that in stopping the same operation. In this image reader, therefore, by repeating such a control it becomes possible to accurately compensate image joints in intermittent data reading. At this time, an ideal image displacement correcting accuracy is 1/(one-line pixels) line accuracy. For example, in the case of reading a size A3 original at 600 dpi, there is obtained a 1/7000 line accuracy because the number of pixels per line is approximately 7000. Thus, the amount of displacement can be regarded as being substantially zero.

Thus, if this image reader is used, even if MTCLK and LS are asynchronous with each other, an image displacement before and after stop of the scanning carriage in intermittent data reading is corrected, so that it is possible to prevent the occurrence of an image quality trouble at a joint portion of images. As to the correction of an image displacement, even in the case of image reading at an arbitrary scale factor in which the operating speed of the scanning carriage is varied, the same joint accuracy as above is obtained without requiring any special additional function using hardware or software. Besides, since it is not necessary to synchronize MTCLK which is for driving the scanning carriage with LS which is a read synchronizing signal in the fast scanning direction, optimization for each block (each circuit) can be attained easily such as taking an appropriate anti-vibration measures or setting a drive gear ratio between the motor 11 and the scanning carriage.

In this image reader, moreover, since it is possible to effect data transfer in accordance with the data processing performance of the succeeding system without requiring such a memory as a page memory, there is no fear of an increase of the device cost even if the quantity of handled image data increases in an accelerative manner with the tendency to a higher reading resolution and coloring of images.

Thus, it can be said that this image reader is very suitable for use in a color copying machine or the like in which the motor driving speed is relatively high and the degree of freedom is low.

Further, in the image reader of this embodiment, the output condition of PS is changed after a change in output condition of INR-PSINT signal which is produced in accordance with PSINT signal and after subsequent output of at least two lines of LS fall in the slow scanning line. In this image reader, therefore, even if the phase control circuit 16 makes a phase control for both MTCLK and LS, it is not likely at all that the read period in CCD may become indefinite or improper data may be included in image data read by CCD. Thus, even if phase control is conducted, the result of reading by CCD is not influenced, so there is obtained a normal image free of any image quality trouble.

In this embodiment an electrical positional deviation is made substantially zero, but in the event the motor 11 (the scanning carriage) oscillates physically at the time of stop or restart-up of the intermittent operation, it is possible that there will occur an image quality trouble at a joint portion of images even if there is made an electrical correction. Therefore, for an accurate compensation for such an image joint portion, it is preferred to take a mechanical anti-oscillation measure together with the phase control described above.

Although in this embodiment no reference is made to a lighting system usually mounted on the scanning carriage, correction may be needed against a variation of light quantity, depending on characteristics of the lighting system used. This is for preventing an image joint portion from becoming visible due to a difference in read density caused by a variation of light quantity although the light quantity variation and the positional accuracy of the joint portion have no direct bearing on each other.

[Second Embodiment]

A description of the second embodiment will here be directed to only different points from the first embodiment.

In the image reader of the first embodiment, when the phase of LS is unknown in controlling the PSINT signal by the CPU 14, or even if it is known, when a delay time when fed back to the control of PSINT signal on the basis of the phase of LS is not ensured in a certain software configuration, it is possible that the number of read lines may vary at every intermittent read. Actually, however, for a certain reason related to control in the succeeding system it is required in many cases that the number of lines (image data quantity) at every intermittent read be made constant. Therefore, in the image reader of this second embodiment there is made a control for keeping constant the number of lines at every intermittent read while ensuring the compensation accuracy in intermittent read described in the first embodiment.

For controlling the number of read lines, the image reader of this embodiment is provided with, in addition to the configuration of the above first embodiment, a register ("READLINE" hereinafter) in which an effective number of read lines at every intermittent operation is set, a slow scanning counter ("PS-COUNTER" hereinafter) for counting the number of read lines in the slow scanning direction in intermittent read, and a register ("PS-DELAY") for counting the number of lines from the time when PSINT signal falls until actual fall of PS and storing the result of the counting. The READLINE and PS-DELAY are provided in the phase control circuit 16, while the PS-COUNTER is provided in the LS generating circuit 15.

The following description is now provided about how intermittent reading operations are controlled in the image reader of this embodiment.

Figure 4A:
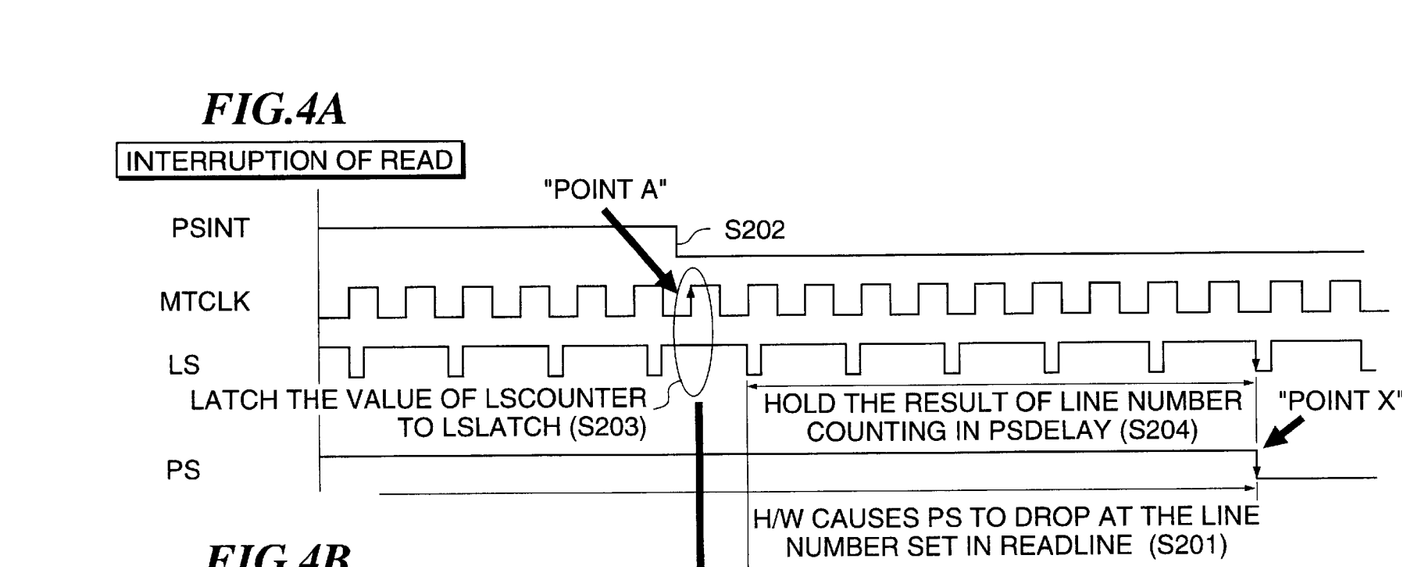
FIG. 4A is a timing chart in stopping the intermittent read and FIG. 4B is a timing chart in restarting the intermittent read.
Figure 4B:
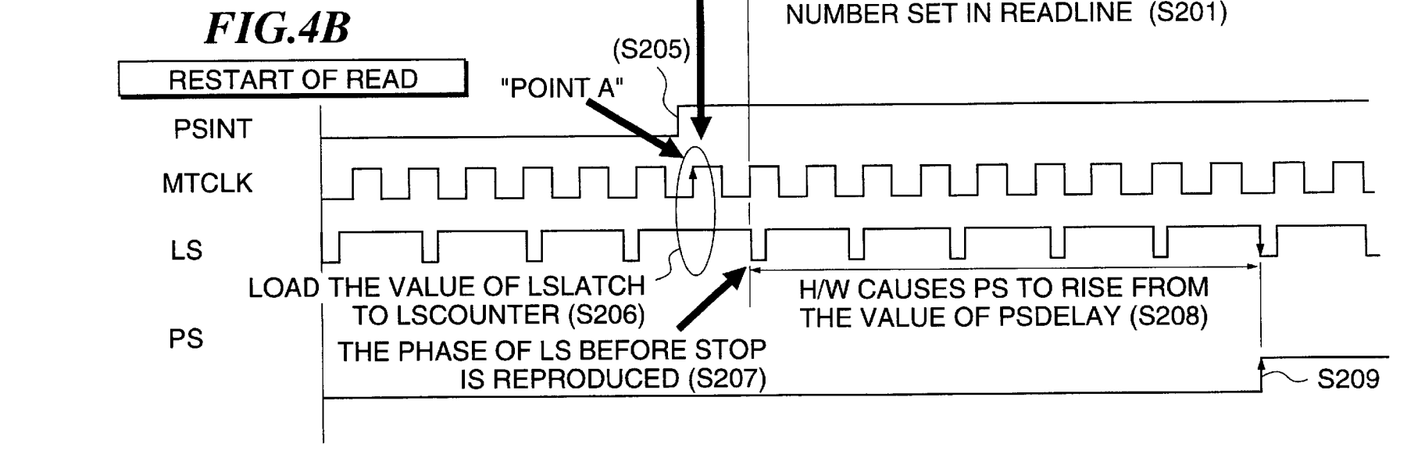

FIGS. 4A and 4B are timing charts showing an example of an intermittent reading operation control performed in this embodiment.

For the initial reading of image data, the CPU 14 clears PS-DELAY to zero beforehand. Consequently, upon rise of LS just after rise of the PSINT signal by the CPU 14, PS goes into an enabled state, whereupon the PS-COUNTER begins to increment in synchronism with a fall edge of LS.

When the count value in the PS-COUNTER reaches a value preset in READLINE, as shown in FIG. 4A, PS goes into a disabled state using a hardware by means of the LS generating circuit 15 and the phase control circuit 16 (S201). This point corresponds to "Point X" described previously. As a result, the number of read lines at every intermittent read becomes constant.

The phase control for LS and MTCLK at this time is different from that in the first embodiment because a fall timing of PS is determined using a hardware by both LS generating circuit 15 and phase control circuit 16.

The CPU 14 calculates from both LS cycle and MTCLK cycle a timing (position) at which PS-DELAY assumes a "substantially constant value", provided the value must be two or more for the reason stated in the first embodiment. More particularly, since both LS cycle and MTCLK cycle are known in advance, the CPU 14 calculates as the "substantially constant value" a value smaller than the preset value in READLINE and of at least 2 while comparing differences in respective cycles, and uses the result of the calculation as a target value in PS-DELAY. For example, as illustrated in the figure, the CPU 14 sets a target value in which PS-DELAY is involved to 6±1 lines.

After determining the target value for PS-DELAY the CPU 14 causes the PSINT signal to fall at "Point A" (S202). At this time, the count value obtained by LS-COUNTER is latched to LS-LATCH in the same manner as in the first embodiment (S203). Also in the same way as in the first embodiment the motor 11 slows down after the effective image area has been read completely, that is, after passage through "Point X", taking the time corresponding to PS-DELAY into account.

Thereafter, when the PS-COUNTER is incremented by the number of lines set in READLINE and PS is disabled using a hardware by means of both LS generating circuit 15 and phase control circuit 16 (S201), the phase control circuit 16 counts, using hardware, the number of falls of LS from the time when INR-PSINT signal has fallen until when PS comes into a disabled state and sets the result of the counting to PS-DELAY (S204).

Once the count value is set to PS-DELAY, the CPU 14, at the time of calculating the next intermittent operation stop timing, reads the count value from the PS-DELAY and performs a feedback control. More specifically, the CPU 14 compares the count value in the PS-DELAY with the target value determined previously and performs a timing control for the PSINT signal while making feedback in such a manner that when the actual count value is larger than the target value, the PSINT fall timing is delayed, while when it is smaller than the target value, the timing is advanced.

By so doing, in this image reader, the value of PS-DELAY can be controlled to a substantially constant value without storage of an error therein at every stop of intermittent operation. That is, the number of read lines from the time when PSINT signal falls until when PS comes into a disabled state becomes almost constant.

Next, a description will be given below about an operation control in restarting the intermittent read.

In FIG. 4B, when the scanning carriage again reaches "Point A", the CPU 14 causes PSINT signal to rise (S205). At this time there is performed the same loading operation for loading the count value latched in LS-LATCH to LS-COUNTER as in the first embodiment (S206). Consequently, as to the phase of LS relative to MTCLK, the state in the intermittent read stop condition is reproduced (S207).

Thereafter, when fall edges of LS have been outputted by a number corresponding to the number of lines stored in PS-DELAY, the phase control circuit 16 raises the PS signal level to H (S208), whereby the PS outputted from the LS generating circuit 15 goes into an enabled state at "Point X" (S209).

In this image reader, by conducting such an operation control, the phase of LS after "Point A" with PSINT signal having been changed is reproduced completely at the time of both stop and restart of intermittent operation while keeping constant the data volume at every intermittent read, whereby it becomes possible to correct a positional deviation in data reading at the disable/enable point ("Point X") of PS.

In the image reader of this embodiment, when the count value obtained by PS-COUNTER has reached the value preset in READLINE after bringing PS into an enable condition, the PS is disabled. In this image reader this processing is performed using a hardware by both LS generating circuit 15 and phase control circuit 16. Therefore, the quantity of data at every intermittent read can be kept constant while ensuring a high compensation accuracy in the intermittent read. Thus, by using this image reader, it is possible to facilitate controlling the succeeding system and hence possible to enhance the flexibility and versatility in building the system.

In this image reader of this embodiment, moreover, the number of times of LS fall from the time when INR-PSINT signal has fallen in accordance with PSINT signal until when PS comes into a disable state is counted and set to PS-DELAY, further, on the basis of the count value in PS-DELAY the CPU 14 makes a feedback control with respect to the next intermittent operation stop timing. Thus, in this image reader, it is possible to control the change in output condition of PS without storing an error in the value of PS-DELAY at every stop of intermittent operation. That is, even where the phase of LS in controlling PSINT signal for example is not certain, it is possible to ensure a predetermined image displacement correcting accuracy while keeping constant the quantity of data at every intermittent read.

Although in this embodiment description has been directed above to a processing example in which the quantity of image data at every intermittent read is kept constant by using READLINE, PS-COUNTER and PS-DELAY in the case where the phase of PS in controlling PSINT signal is not certain, it is possible to keep constant the quantity of data to be read in a single intermittent operation even in the previous first embodiment if only the image reader of the first embodiment is provided with a unit capable of accurately grasping the quantity of image data at every intermittent read and a PSINT signal controlling unit capable of keeping constant the number of lines to be read in a single intermittent operation on the basis of LS phase information.

Although in the above first and second embodiments, as to the image pick-up unit for reading images from an original, reference has been made as an example to an image pick-up unit provided with a fixed CCD and a scanning carriage capable of moving in the slow scanning direction, the present invention is applicable to any other image pick-up unit insofar as the same unit is configured so that a relative position between the original and the image pick-up unit in the slow scanning direction can be changed. For example, the present invention is applicable even to an image pick-up unit having a CCD capable of moving in the slow scanning direction or an image pick-up unit configured so as to move an original itself relative to a fixed CCD.

Further, in the present invention, all of the portions controlled by the CPU 14 in the first and second embodiments may be implemented by a logic configured by hardware.

In the image reader according to the present invention, as set forth hereinabove, even if the fast synchronizing signal (LS) and the drive control signal (MTCLK) are asynchronous with each other, there is no fear of phase shift of both signals between a stop condition and a restart condition of intermittent read, whereby it becomes possible to accurately compensate an image joint portion in intermittent read.

Thus, according to this image reader it is possible to prevent the occurrence of an image quality trouble at an image joint portion even if the fast scanning synchronizing signal and the drive control signal are asynchronous with each other in intermittent read. As to the correction of an image displacement, there is attained a predetermined joint compensating accuracy even when image data are read at an arbitrary scale factor. Besides, since the fast scanning synchronizing signal and the drive control signal are asynchronous with each other, optimization for each block can be attained easily such as taking anti-vibration measures. Further, it is possible to effect the transfer of data according to the data processing performance of the succeeding system without requiring such a memory as a page memory, so there is no fear of an increase in the device cost even if the quantity of image data handled increases with the recent tendency to higher read resolution and coloring of image.

Now it should be readily seen that this image reader is very suitable for use in a color copying machine or the like wherein the motor operating speed is relatively high and the degree of freedom is low.

What is claimed is:

1. An image reader comprising:
    an image pick-up unit which reads an image from an original in a fast scanning direction in accordance with a fast scanning synchronizing signal of a predetermined cycle;
    a drive unit which causes the image pick-up unit and the image from the original to move in a slow scanning direction in accordance with a drive control signal asynchronous with the fast scanning synchronizing signal;
    an intermittent read instruction unit which generates a stop instruction and a restart instruction for allowing the image reading to be performed in the slow scanning direction by the image pick-up unit;
    a phase holding unit which recognizes and holds a phase difference between the fast scanning synchronizing signal and the drive control signal upon issuance of a stop instruction from the intermittent read instruction unit; and
    a phase correcting unit which, upon issuance of a restart instruction from the intermittent read instruction unit, corrects a phase difference between the fast scanning synchronizing signal and the drive control signal on the basis of the phase difference recognized and held by the phase holding unit.

2. The image reader according to claim 1, wherein the image pick-up unit is provided with a signal generating unit which outputs a slow scanning synchronizing signal for defining an effective image area in the slow scanning direction in performing the image reading, and wherein the signal generating unit, upon issuance of the stop instruction or the restart instruction from the intermittent read instruction unit, causes an output state of the slow scanning synchronizing signal to change after an output state of the fast scanning synchronizing signal has changed for at least two lines in the slow scanning direction from the time when the stop or restart instruction was issued.

3. The image reader according to claim 1, wherein the image pick-up unit comprises:

a signal generating unit which outputs a slow scanning synchronizing signal for defining an effective image area in the slow scanning direction in performing the image reading;

a number-of-lines counting unit which counts the number of lines in the slow scanning direction in which the image pick-up unit performs the image reading; and a number-of-lines defining unit which defines the number of effective read lines in the slow scanning direction in a single intermittent image reading, the signal generating unit, after output of a slow scanning synchronizing signal, terminates the output of the slow scanning synchronizing signal when the number of lines counted by the number-of-line counting unit has reached the number of lines defined by the number-of-lines defining unit.

4. An image reader according to claim 3, further comprising:

a number-of-lines monitoring unit which counts changes in the output state of the fast scanning synchronizing signal in terms of the number of lines in the slow scanning direction from the time when a stop instruction was issued by the intermittent read instruction unit until termination of the output of the slow scanning synchronizing signal in the signal generating unit, wherein on the basis of the result of the counting made by the number-of-lines monitoring unit the intermittent read instruction unit causes a generation timing of a stop instruction to be generated next to the stop instruction generated to change.

* * * * *